US005966784A

United States Patent [19]

Arbogast et al.

[11] Patent Number: 5,966,784

[45] Date of Patent: Oct. 19, 1999

[54] METHOD AND APPARATUS FOR INDICATING THE LOCKED OR UNLOCKED CONDITION OF A SEAT BELT BUCKLE

[75] Inventors: Thomas P. Arbogast, Troy; Derrick G. Titus, Plymouth, both of Mich.

[73] Assignee: TRW Inc., Lyndhurst, Ohio

[21] Appl. No.: 08/900,349

[22] Filed: Jul. 25, 1997

[51] Int. Cl.[6] .......... A44B 11/26

[52] U.S. Cl. .......... 24/633; 24/642; 340/457.1

[58] Field of Search .......... 24/603, 633, 303, 24/636–338, 640, 641, 650, 642, 645, 646; 297/468, 180, 270, 268; 340/457.1

[56] References Cited

U.S. PATENT DOCUMENTS

| | | | |
|---|---|---|---|
| 3,147,819 | 9/1964 | Keleher . | |
| 3,766,612 | 10/1973 | Hattori . | |
| 3,770,919 | 11/1973 | Lewis . | |
| 4,047,267 | 9/1977 | Lindblad . | |
| 4,103,842 | 8/1978 | Martin et al. . | |
| 4,112,408 | 9/1978 | Roozenbeek . | |
| 4,943,087 | 7/1990 | Sasaki . | |
| 5,032,812 | 7/1991 | Banick et al. . | |
| 5,060,977 | 10/1991 | Saito . | |
| 5,107,846 | 4/1992 | Atlas . | |
| 5,406,252 | 4/1995 | Dear . | |
| 5,481,078 | 1/1996 | Asche . | |
| 5,590,904 | 1/1997 | Ellis et al. | 340/457.7 X |
| 5,742,986 | 4/1998 | Corrion et al. | 24/633 |
| 5,752,299 | 5/1998 | Vivacqua et al. | 24/633 |
| 5,839,174 | 11/1998 | Chamings et al. | 24/633 |

FOREIGN PATENT DOCUMENTS

| | | |
|---|---|---|
| 0562740 | 9/1993 | European Pat. Off. . |
| 0842832 | 5/1998 | European Pat. Off. . |
| 2368830 | 5/1978 | France . |
| 1278293 | 9/1968 | Germany . |
| 212425 | 8/1984 | Germany . |
| 4214222A1 | 4/1993 | Germany . |
| 4308038 | 9/1994 | Germany . |
| 2228183A | 8/1990 | United Kingdom . |
| 949593 | 7/1991 | United Kingdom . |

OTHER PUBLICATIONS

Research Disclosure 2244 (1996) Mar., No. 383 Emsworth, GB, XP 000581332, p. 193, 38333, "Seat Belt Buckle Switch".

Research Disclosure 2244 (1992) Dec., No. 344 Emsworth, GB, XP 00327165, p. 940, 34457, "Air Bag Inhibitor for Use with Infant Seat".

*Primary Examiner*—James R. Brittain
*Assistant Examiner*—Robert J. Sandy
*Attorney, Agent, or Firm*—Tarolli, Sundheim, Covell, Tummino & Szabo LLP

[57] ABSTRACT

A Hall effect device (60) is exposed to a magnetic field having flux lines extending in a first direction relative to the Hall effect device (60) if a seat belt tongue (16) is not locked in a seat belt buckle (12). The Hall effect device (60) is exposed to a magnetic field having flux lines extending in a second, opposite direction relative to the Hall effect device if the tongue (16) is locked in the buckle (12). The output of the Hall effect device (60) indicates whether or not the tongue (16) is locked in the buckle (12).

13 Claims, 2 Drawing Sheets

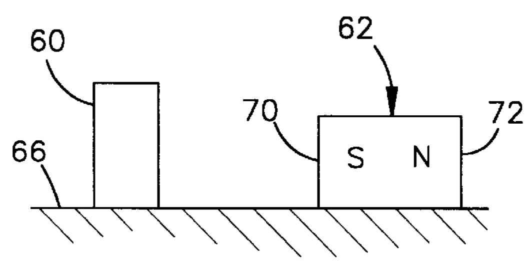
Fig.5
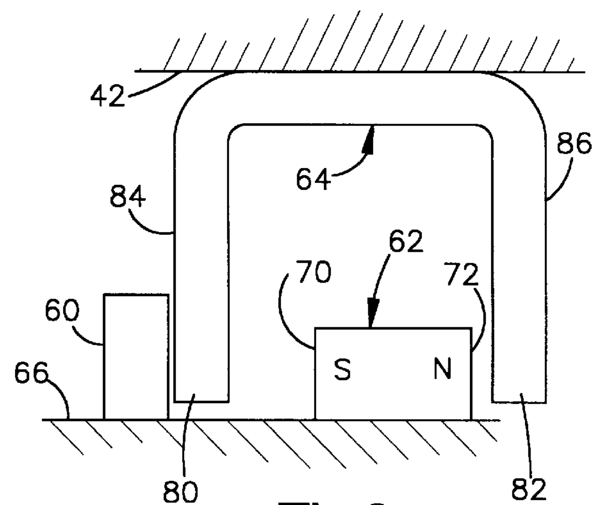
Fig.6
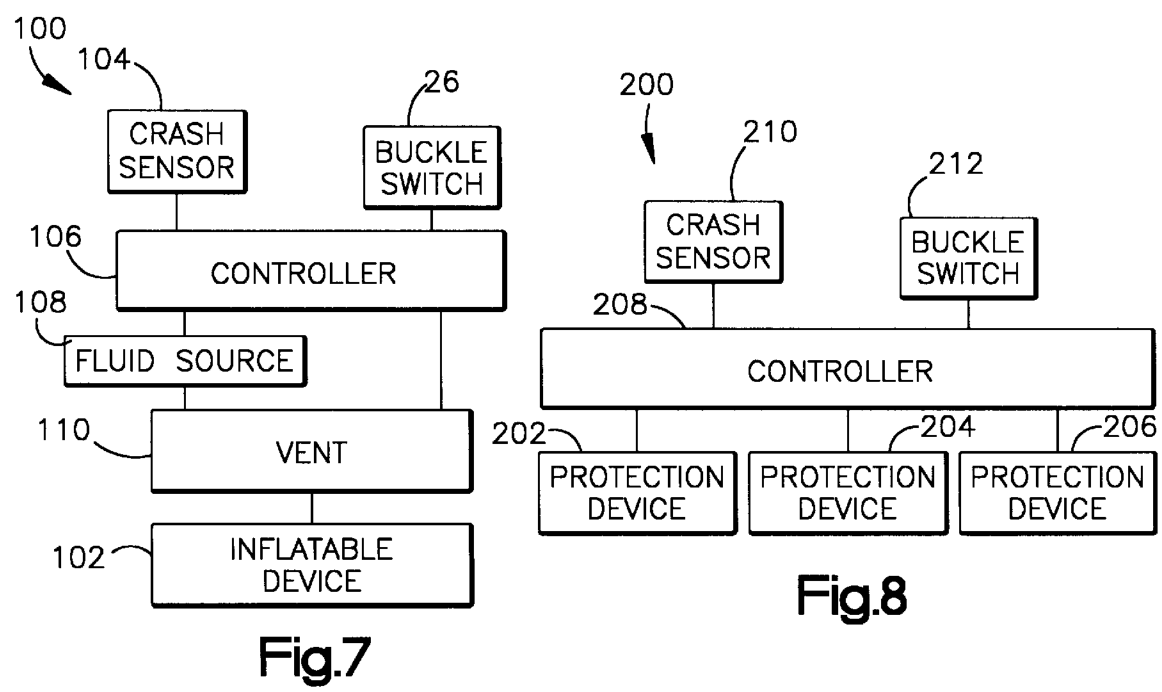
Fig.7
Fig.8

METHOD AND APPARATUS FOR INDICATING THE LOCKED OR UNLOCKED CONDITION OF A SEAT BELT BUCKLE

FIELD OF THE INVENTION

The present invention relates to a seat belt buckle.

BACKGROUND OF THE INVENTION

A seat belt system for restraining a vehicle occupant typically includes seat belt webbing, a seat belt locking tongue on the webbing, and a seat belt buckle. The tongue on the webbing is inserted in the buckle when the webbing has been placed about a vehicle occupant. A latch mechanism in the buckle interlocks with the tongue to secure the webbing about the occupant. Such a seat belt system may also include a buckle switch for indicating whether or not the tongue is locked in the buckle.

SUMMARY OF THE INVENTION

The present invention comprises a method and apparatus for indicating whether or not a seat belt tongue is interlocked with a latch mechanism in a seat belt buckle.

The apparatus comprises a Hall effect device. If the seat belt tongue is not interlocked with the latch mechanism, the Hall effect device is exposed to a magnetic field having flux lines extending in a first direction relative to the Hall effect device. If the seat belt tongue is interlocked with the latch mechanism, the Hall effect device is exposed to a magnetic field having flux lines extending in a second, opposite direction relative to the Hall effect device. Accordingly, the output of the Hall effect device indicates whether or not the tongue is locked in the buckle.

In a preferred embodiment of the present invention, the apparatus comprises a source of a first magnetic field having a first polarity, and a source of a second magnetic field having a second, opposite polarity. The source of the first magnetic field is located in energizing relationship with the Hall effect device when the tongue is not interlocked with the latch mechanism. A movable part of the latch mechanism moves the source of the second magnetic field into energizing relationship with the Hall effect device upon interlocking of the tongue with the latch mechanism.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIGS. 5 and 6 are schematic top views of parts shown in FIGS. 2–4;

FIG. 7 is a schematic view of a deployment system including parts of the apparatus of FIG. 1; and FIG. 8 is a schematic view of a deployment system including a second embodiment of the present invention.

DESCRIPTION OF PREFERRED EMBODIMENTS

Figure 1:
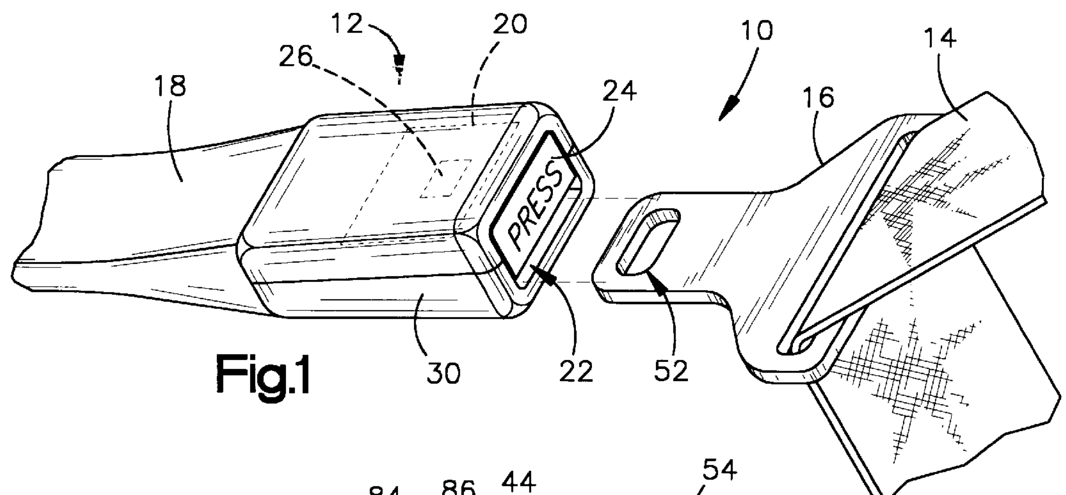
FIG. 1 is an isometric view of a vehicle occupant restraint apparatus comprising a first embodiment of the present invention.

A vehicle occupant restraint apparatus 10 comprising a first embodiment of the present invention is shown partially in FIG. 1. The apparatus 10 includes a seat belt buckle 12, seat belt webbing 14, and a seat belt tongue 16 on the webbing 14. The buckle 12 is anchored in a vehicle in a known manner, such as by a cable or anchor strap (not shown) extending within a cover 18. A latch mechanism 20 (shown schematically) locks the tongue 16 in the buckle 12 when the tongue 16 is moved into an opening 22 at the end of the buckle 12. The tongue 16 is subsequently released from the buckle 12 upon depression of a pushbutton 24 adjacent to the opening 22.

A buckle switch 26 (also shown schematically) is located within the buckle 12. As described fully below, the buckle switch 26 indicates whether or not the tongue 16 is locked in the buckle 12.

The buckle 12 includes a housing 30. The latch mechanism 20 is contained in the housing 30, and may comprise any suitable structure capable of releasably interlocking with the tongue 16 in cooperation with the pushbutton 24. As shown schematically by way of example in FIGS. 2–4, the latch mechanism 20 in the first embodiment of the present invention has a plurality of known parts including the pushbutton 24, an ejector 40 and a latch 42.

Figure 2:
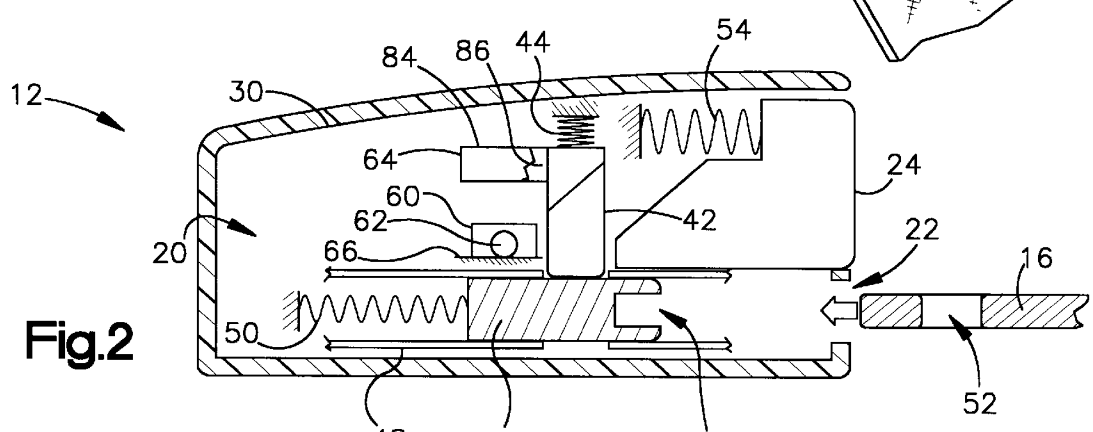
FIG. 2 is a side view, partly in section, of parts of the apparatus of FIG. 1, with certain parts being shown schematically.
Figure 3:
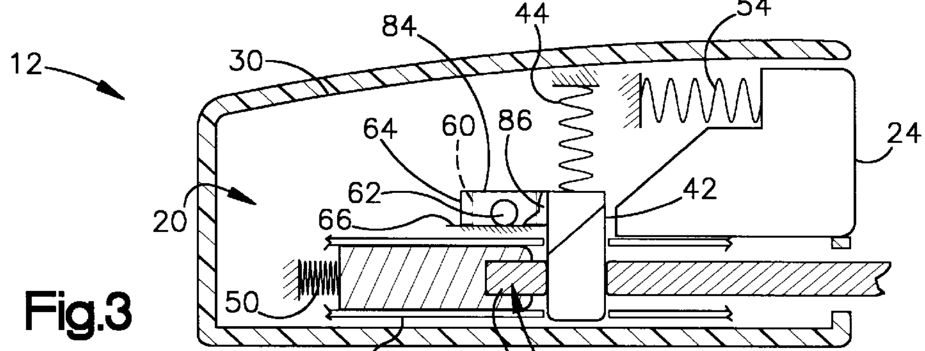
FIGS. 3 and 4 are views similar to FIG. 2 showing parts in different positions.

The latch 42, which is sometimes referred to as a locking bar, locking element, or the like, is movable between a non-locking position (FIG. 2) and a locking position (FIG. 3). When the tongue 16 is located outside the buckle 12, as shown in FIG. 2, the ejector 40 holds the latch 42 in the non-locking position against the bias of a latch spring 44.

When the tongue 16 is inserted through the opening 22, as indicated by the arrow shown in FIG. 2, it is moved into engagement with the ejector 40 in a notch 46 at the end of the ejector 40. The tongue 16 is then moved inward against the ejector 40 so as to push the ejector 40 along a guide track 48 from a forward position (FIG. 2) to a rearward position (FIG. 3) against the bias of an ejector spring 50.

As the tongue 16 and the ejector 40 approach the positions of FIG. 3, an aperture 52 in the tongue 16 moves into alignment with the latch 42. The latch spring 44 then moves the latch 42 to the locking position through the aperture 52 in the tongue 16 so that the latch 42 blocks removal of the tongue 16 from the buckle 12. The tongue 16 is thus interlocked with the latch mechanism 20 when the tongue 16 is moved into the buckle 12 to the position of FIG. 3.

Figure 4:
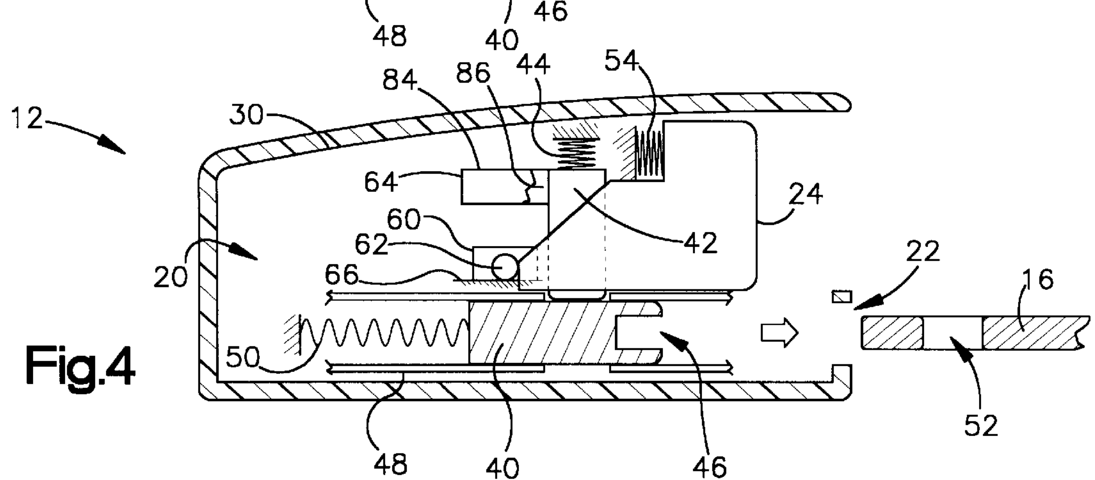

When the tongue 16 is to be released from the buckle 12, the pushbutton 24 is moved from the position of FIGS. 2 and 3 to the position of FIG. 4 against the bias of a pushbutton spring 54. The pushbutton 24 engages, or may be linked with, the latch 42 in a known manner so as to move the latch 42 back out of the aperture 52 in the tongue 16 against the bias of the latch spring 44. The ejector spring 50 then moves the ejector 40 back outward along the guide track 48 toward the opening 22 to eject the tongue 16 from the buckle 12.

As shown schematically in FIGS. 2–4, the buckle switch 26 in the first embodiment of the present invention includes a Hall effect device 60, a source 62 of a magnetic field, and a conductor 64 of the magnetic field. The Hall effect device 60 in the first embodiment comprises a bipolar Hall effect sensor. However, the Hall effect device 60 may alternatively comprise any other suitable Hall effect device known in the art, and can be connected with a power supply by any suitable circuitry known in the art. The field source 62 preferably comprises a permanent magnet.

The Hall effect device 60 is mounted on a support structure 66 which may comprise any suitable stationary portion of the buckle 12. The magnet 62 is mounted on the support structure 66 beside the Hall effect device 60. As best shown in the schematic views of FIGS. 5 and 6, the magnet 62 is fixed in an energizing relationship with the Hall effect device 60. More specifically, the magnet 62 has a south pole 70 adjacent to the Hall effect device 60, and has a north pole 72 relatively remote from the Hall effect device 60. In the arrangement of FIG. 5, the Hall effect device 60 has a first energized condition under the influence of a first, negative magnetic field provided by the magnet 62 adjacent to the south pole 70. The Hall effect device 60 then has a first output which is determined by the direction of the flux lines converging toward the south pole 70.

The field conductor 64 in the first embodiment of the present invention is an armature which is mounted on the latch 42 for movement with the latch 42. The armature 64 moves from a non-actuated position, as shown in FIG. 2, to an actuated position, as shown in FIG. 3, upon movement of the latch 42 from the non-locking position to the locking position. As shown in FIG. 6, the armature 64 is a U-shaped part with opposite end portions 80 and 82 defined by arms 84 and 86 projecting from the latch 42.

When the armature 64 is in the non-actuated position of FIG. 2, it is spaced fully from the Hall effect device 60 and the magnet 62. The Hall effect device 60 then has the output described above with reference to FIG. 5. When the armature 64 is in the actuated position of FIG. 3, one end portion 80 of the armature 64 is interposed between the Hall effect device 60 and the south pole 70 of the magnet 62, as shown in FIG. 6. The other end portion 82 of the armature 64 is simultaneously moved close enough to the north pole 72 of the magnet 62 to conduct a magnetic field from the north pole 72. The armature 64 then functions as a source of a second, positive magnetic field by conducting a magnetic field from the north pole 72 to the Hall effect device 60. This switches the Hall effect device 60 to a second, differently energized condition determined by the second, positive magnetic field emanating from the adjacent end portion 80 of the armature 64. Accordingly, the Hall effect device 60 then has a second, different output determined by the relatively opposite direction of the flux lines diverging from the adjacent end portion 80 of the armature 64.

Since the Hall effect device 60 in the first embodiment of the present invention comprises a bipolar Hall effect sensor, one of the first and second energized conditions is an on condition, and the other is an off condition. For example, the Hall effect device 60 may comprise a bipolar Hall effect sensor known as a Siemens PLE 4953 sensor with current interface. That sensor is on under the influence of a negative (south) magnetic field above 190 Gauss, and is off under the influence of a positive (north) field. The Hall effect device 60 is thus switched on and off upon movement of the latch 42 between the non-locking and locking positions. This provides a certain indication of whether or not the tongue 16 is interlocked with the latch mechanism 20.

The buckle switch 26 can be used to alert a vehicle occupant to the locked or unlocked condition of the tongue 16 and buckle 12. For example, an audible alarm or a lamp on the vehicle instrument panel could be activated in response to the output of the Hall effect device 60 to alert a vehicle occupant if the tongue 16 is not locked in the buckle 12.

The buckle switch 26 can also be used to control deployment of one or more vehicle occupant protection devices. For example, as shown schematically in the block diagram of FIG. 7, the buckle switch 26 is included in a deployment system 100 with an inflatable vehicle occupant protection device 102. The deployment system 100 further includes a crash sensor 104, a controller 106, and a source 118 of inflation fluid. A vent 110 is interposed between the source 108 of inflation fluid and the inflatable device 102.

The inflatable device 102 can be any one of several different types of inflatable vehicle occupant protection devices known in the art. Such inflatable devices include air bags, inflatable seat belts, inflatable knee bolsters, inflatable head liners, and knee bolsters operated by air bags.

The crash sensor 104 may comprise any known apparatus for sensing a vehicle condition that indicates the occurrence of a crash. Such a vehicle condition may comprise sudden deceleration, transverse acceleration or crushing of a side portion of a vehicle, a vehicle rollover, or the like. If the crash-indicating condition is at or above a predetermined threshold level, it indicates the occurrence of a crash or other event for which deployment of the inflatable device 102 is desired to help protect an occupant of the vehicle. The crash sensor 104 then provides a deployment signal to the controller 106.

When the controller 106 receives a deployment signal from the crash sensor 104, it responds by actuating the fluid source 108 to initiate inflation of the inflatable device 102. The controller 106 further responds to the output of the Hall effect device 60 in the buckle switch 26 by operating the vent 110 in accordance with the locked or unlocked condition of the tongue 16 and buckle 12. If the output of the Hall effect device 60 indicates that the tongue 16 is not locked in the buckle 12, the controller 106 causes the vent 110 to direct a first amount of inflation fluid away from the inflatable device 102. The inflatable device 102 is then deployed in a first mode for protection of a vehicle occupant who is not restrained by the seat belt webbing 14. If the output of the Hall effect device 60 indicates that the tongue 16 is locked in the buckle 12, the controller 106 causes the vent 110 to direct a second, different amount of inflation fluid away from the inflatable device 102. The inflatable device 102 is then deployed in a second, different mode for protection of a vehicle occupant who is restrained by the seat belt webbing 14.

A second embodiment of the present invention is shown partially in the block diagram of FIG. 8. The second embodiment comprises another example of a deployment system that can be operated in differing modes in accordance with the present invention. The second embodiment thus comprises a deployment system 200 for a plurality of vehicle occupant protection devices 202, 204 and 206. In addition to the protection devices 202, 204 and 206, the deployment system 200 includes a controller 208, a crash sensor 210, and a buckle switch 212 in accordance with the present invention. Like the buckle switch 26 described above, the buckle switch 212 includes a Hall effect device that provides a first output if a seat belt tongue is not locked in a corresponding buckle and provides a second, different output if a seat belt tongue is locked in the buckle.

Each of the protection devices 202, 204 and 206 can be an inflatable device, a seat belt pretensioner, a seat belt retractor lock, or any other device that is deployed for protection of a vehicle occupant. When the controller 208 receives a deployment signal from the crash sensor 210, it deploys one or more of the protection devices 202, 204 and 206 in a first mode if the Hall effect device in the buckle switch 212 provides the first output. The controller 208 deploys one or more of the protection devices 202, 204 and 206 in a second, different mode if the Hall effect device in the buckle switch 212 provides the second output.

Each mode of deployment for the protection devices 202, 204 and 206 may comprise simultaneous or sequential deployment of the protection devices 202, 204 and 206 with a predetermined timing. Each mode of deployment may alternatively comprise deployment of less than all of the protection devices 202, 204 and 206. For example, if the protection devices 202, 204, and 206 include a pretensioner, a retractor lock, or another device that functions to help control tension in the seat belt webbing, it may be preferable not to deploy that protection device if the Hall effect device in the buckle switch 212 indicates that the tongue is not locked in the buckle. Moreover, if the protection devices 202, 204 and 206 include an inflatable device, each mode of deployment may comprise the use of one or more inflation pressure control devices like the vent 192 described above with reference to FIG. 8. The first and second deployment modes could also differ from each other by the use of a fluid source that operates in different stages to provide inflation fluid in correspondingly different amounts (with or without venting) or at correspondingly different times, and/or by providing multiple sources of inflation fluid which are operative selectively.

From the above description of the invention, those skilled in the art will perceive improvements, changes and modifications. Such improvements, changes and modifications within the skill of the art are intended to be covered by the appended claims.

Having described the invention, the following is claimed:

1. A method comprising the steps of:

exposing a Hall effect device to a magnetic field having flux lines extending in a first direction relative to said Hall effect device if a seat belt tongue is not interlocked with a latch mechanism; and exposing said Hall effect device to a magnetic field having flux lines extending in a second, opposite direction relative to said Hall effect device if said seat belt tongue is interlocked with said latch mechanism, whereby the output of said Hall effect device indicates whether or not said seat belt tongue is interlocked with said latch mechanism.

2. A method as defined in claim 1 wherein said Hall effect device is exposed to a first magnetic field having a first polarity if said seat belt tongue is not interlocked with said latch mechanism, and to a second magnetic field having a second, opposite polarity if said seat belt tongue is interlocked with said latch mechanism.

3. A method as defined in claim 1 wherein a first magnetic pole energizes said Hall effect device if said seat belt tongue is not interlocked with said latch mechanism, and a second, opposite magnetic pole energizes said Hall effect device upon interlocking of said belt tongue with said latch mechanism.

4. A method as defined in claim 3 wherein a conductor is moved to an actuated position conducting a magnetic field from said second magnetic pole to said Hall effect device upon interlocking of said seat belt tongue with said latch mechanism.

5. A method as defined in claim 4 wherein said conductor is interposed between said Hall effect device and said first magnetic pole when in said actuated position.

6. Apparatus comprising:

a latch mechanism which releasably interlocks with a seat belt tongue;

a Hall effect device; and switching means for exposing said Hall effect device to a first magnetic field having a first polarity if a seat belt tongue is not interlocked with said latch mechanism, and for exposing said Hall effect device to a second magnetic field having a second, opposite polarity if said seat belt tongue is interlocked with said latch mechanism.

7. Apparatus as defined in claim 6 wherein said Hall effect device comprises a bipolar Hall effect sensor.

8. Apparatus as defined in claim 6 further comprising deployment means for deploying a vehicle occupant protection device in response to a predetermined vehicle condition, said deployment means operating in a first mode in response to an output provided by said Hall effect device under the influence of said first magnetic field, and operating in a second mode in response to an output provided by said Hall effect device under the influence of said second magnetic field.

9. Apparatus as defined in claim 8 wherein said deployment means deploys said protection device when operating in said first mode and does not deploy said protection device when operating in said second mode.

10. Apparatus comprising:

a latch mechanism which releasably interlocks with a seat belt tongue;

a Hall effect device;

a source of a first magnetic field having a first polarity, said source of said first magnetic field being located in energizing relationship with said Hall effect device; and a source of a second magnetic field having a second, opposite polarity;

said latch mechanism including means for moving said source of said second magnetic field relative to said Hall effect device so as to locate said source of said second magnetic field in energizing relationship with said Hall effect device upon interlocking of a seat belt tongue with said latch mechanism.

11. Apparatus as defined in claim 10 wherein said Hall effect device comprises a bipolar Hall effect sensor.

12. Apparatus as defined in claim 10 wherein said moving means moves said source of said second magnetic field to an actuated position interposed between said Hall effect device and said source of said first magnetic field.

13. Apparatus as defined in claim 10 wherein said source of said first magnetic field comprises a permanent magnet, said source of said second magnetic field comprising an armature having an actuated position conducting said second magnetic field from said magnet to said Hall effect device.

* * * * *